US012669394B2

(12) United States Patent
Woelke et al.

(10) Patent No.: US 12,669,394 B2
(45) Date of Patent: Jun. 30, 2026

(54) METHOD FOR PROCESSING A SENSOR, AND SENSOR

(71) Applicant: Robert Bosch GmbH, Stuttgart (DE)

(72) Inventors: Florian Woelke, Gerlingen (DE); Christoph Ueffing, Renningen (DE); Harald Leibbrand, Ditzingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 285 days.

(21) Appl. No.: 18/512,166

(22) Filed: Nov. 17, 2023

(65) Prior Publication Data

US 2024/0165745 A1 May 23, 2024

(30) Foreign Application Priority Data

Nov. 21, 2022 (DE) ..................... 10 2022 212 403.0

(51) Int. Cl.
 G01L 19/06 (2006.01)
(52) U.S. Cl.
 CPC ................................ G01L 19/0627 (2013.01)
(58) Field of Classification Search
 CPC ........................ G01L 19/0627; G01L 19/0654
 See application file for complete search history.

(56) References Cited

U.S. PATENT DOCUMENTS

| | | | |
|---|---|---|---|
| 4,993,265 A | 2/1991 | Koen et al. | |
| 9,190,339 B2 * | 11/2015 | Chan | H01L 23/04 |
| 9,343,695 B2 * | 5/2016 | Hack | H10K 59/84 |
| 11,946,834 B1 * | 4/2024 | Junghans | G01N 33/227 |
| 2016/0069763 A1 * | 3/2016 | Lo | G01L 19/147 |
| | | | 438/51 |

FOREIGN PATENT DOCUMENTS

| | | | |
|---|---|---|---|
| CN | 215529442 U | * | 1/2022 |
| DE | 102004033475 A1 | | 8/2005 |
| DE | 102010043811 A1 | | 5/2012 |
| DE | 102020213672 A1 | | 5/2022 |
| DE | 102020214796 A1 | | 5/2022 |

* cited by examiner

*Primary Examiner* — Justin N Olamit
(74) *Attorney, Agent, or Firm* — NORTON ROSE FULBRIGHT US LLP

(57) ABSTRACT

A method for processing a sensor, in particular a pressure sensor, wherein the sensor has a sensing element arranged in a housing, wherein the housing has a housing opening, wherein a gel covering the sensing element is arranged inside the housing. The method includes: applying laser radiation through the housing opening to a gel surface of the gel facing away from the sensing element, such that the gel surface is modified by the applied laser radiation. A sensor, in particular a pressure sensor, comprising: a sensing element arranged in a housing, wherein the housing has a housing opening, wherein a gel covering the sensing element is arranged inside the housing, wherein the gel has a gel surface facing away from the sensing element and modified by laser radiation.

10 Claims, 7 Drawing Sheets apply laser radiation through housing opening to a gel surface — 101 gel surface modified by applied laser radiation — 103

605

603     803     801     803

METHOD FOR PROCESSING A SENSOR, AND SENSOR

CROSS REFERENCE

The present application claims the benefit under 35 U.S.C. § 119 of German Patent Application No. DE 10 2022 212 403.0 filed on Nov. 21, 2022, which is expressly incorporated herein by reference in its entirety.

FIELD

The present invention relates to a method for processing a sensor, and to a sensor.

BACKGROUND INFORMATION

German Patent Application No. DE 10 2020 214 796 A1 describes a method for producing a sensor.

A sensing element of a sensor can, for example, be covered with a gel, which has a protective function for the sensing element and transfers a property and/or a composition of an ambient medium of the sensor to the sensing element.

A gel surface can thus come into contact with different media and impurities. In this way, a gel surface can become soiled over time, as this surface usually has a high gel tack, such that dirt and dust particles can easily remain stuck to the gel surface. As a result, a solid dirt crust can form on the gel surface over the service life of the sensor, which can impair the functionality of the sensor, for example the pressure sensitivity in a pressure sensor, as the crust growth increases.

SUMMARY

An object of the present invention is to provide a design that reduces the surface tack of a gel surface of a sensor.

This problem may be solved by features of the present invention. Advantageous example embodiments of the present invention are disclosed herein.

According to a first aspect of the present invention, a method for processing a sensor, in particular a pressure sensor, is provided, wherein the sensor has a sensing element arranged in a housing, wherein the housing has a housing opening, wherein a gel covering the sensing element is arranged inside the housing.

According to an example embodiment of the present invention, the method comprises the following steps: applying laser radiation through the housing opening to a gel surface of the gel facing away from the sensing element, such that the gel surface is modified by the applied laser radiation.

According to a second aspect of the present invention, a sensor, in particular a pressure sensor, is provided. According to an example embodiment of the present invention, the device comprises: a sensing element arranged in a housing, wherein the housing has a housing opening, wherein a gel covering the sensing element is arranged inside the housing, wherein the gel has a gel surface facing away from the sensing element and modified by laser radiation.

The present invention is based on and includes the recognition that a gel surface of a gel covering a sensing element of a sensor is modified by the application of laser radiation. A gel tack of the gel surface is thereby advantageously reduced, such that dirt and dust particles can adhere less easily. In this way, a degree of soiling can advantageously be reduced. In this way, the above-described crust formation due to adhesion or sticking of dirt and dust particles can further be efficiently reduced. A resulting impairment of a functionality of the sensor can thereby be efficiently reduced.

In one example embodiment of the method of the present invention, the modification comprises removing gel material from the gel surface and/or structuring the gel surface and/or processing, in particular planar processing, the gel surface.

This results in the technical advantage, for example, that the gel surface can be efficiently modified.

Processing is carried out, for example, without removing gel material and/or without structuring the gel surface, i.e., introducing a special structure into the gel surface.

In one example embodiment of the method of the present invention, the structuring comprises forming a ring structure, in particular having a plurality of concentric rings, and/or a line structure, in particular having a plurality of parallel lines.

This results in the technical advantage, for example, that the gel surface can be efficiently structured. In this way, for example, a ring structure is formed. The ring structure comprises, for example, a plurality of concentric rings. Concentric refers here, for example, to a center point of the sensor housing, or the gel surface. For example, a line structure is formed. The line structure has, for example, a plurality of parallel lines.

In one example embodiment of the method of the present invention, the sensor and the laser radiation are moved relative to each other during the application of laser radiation to the gel surface, in particular based on a specified target relative movement.

This results in the technical advantage, for example, that the application and thus the modification of the gel surface can be carried out efficiently. According to this embodiment, the sensor and the laser radiation are therefore moved relative to each other during the application of the laser radiation to the gel surface. This means, for example, that either only the sensor or only the laser radiation, or both the sensor and the laser radiation, are moved. The fact that the laser radiation is moved means, for example, that a laser generating the laser radiation is moved. The fact that the laser radiation is moved means, for example, that an optical element that directs the laser radiation onto the gel surface is moved.

According to an example embodiment of the present invention, movement of the sensor and laser radiation relative to each other is carried out, for example, based on a specified target relative movement. In particular, this means that a target relative movement is specified, based on which the sensor and the laser radiation are moved relative to each other.

For example, the specified target relative movement specifies a pattern and/or a structure along which the sensor and/or the laser radiation correspondingly move.

For example, the laser and/or the sensor executes the specified target relative movement.

In one example embodiment of the method of the present invention, at least one irradiation parameter of the laser radiation is determined based on at least one gel property, in particular an optical gel property, wherein the application of laser radiation to the gel surface is carried out based on the at least one irradiation parameter.

This results in the technical advantage, for example, that the application of laser radiation to the gel surface can be carried out efficiently.

The fact that laser radiation is applied to the gel surface based on the at least one irradiation parameter means, for example, that the laser radiation has the at least one irradiation parameter.

The gel property is thus an optical gel property, for example. An optical property is, for example, an absorption rate or a transmission rate.

In one example embodiment of the method of the present invention, the at least one irradiation parameter is in each case an element selected from the following group of irradiation parameters: laser wavelength, laser power, laser beam diameter, pulse duration in the case of pulsed laser radiation, pulse frequency in the case of pulsed laser radiation.

This results in the technical advantage, for example, that particularly suitable irradiation parameters can be provided.

For example, the gel surface irradiated with laser radiation having a specific laser wavelength and/or a specific laser power and/or a specific laser beam diameter. For example, the application of laser radiation to the gel surface includes applying laser pulses to the gel surface which, for example, have the above-described pulse duration and/or pulse frequency.

Laser radiation within the meaning of the present description includes, for example, pulsed laser radiation. This means, for example, that laser pulses are applied to the gel surface.

A pulse duration can be in the femtosecond range, for example.

Laser radiation within the meaning of the present description thus includes in particular continuous laser radiation and/or laser pulses. A laser that generates laser radiation is therefore, for example, a continuous wave laser or a pulsed laser.

For example, a laser wavelength is used for the laser radiation for which an absorption rate of the gel at the corresponding laser wavelength is greater than, or greater than or equal to, a predetermined minimum threshold value. The predetermined minimum threshold value is, for example, 80%, where 100% refers to a complete absorption of the applied laser radiation of the corresponding wavelength.

For example, a laser wavelength is used for the laser radiation for which a transmission rate of the gel at the corresponding laser wavelength is less than or equal to a predetermined minimum threshold value. The predetermined minimum threshold value is, for example, 20%, where 100% refers to a complete transmission of the applied laser radiation of the corresponding wavelength.

Thus, when selecting a suitable wavelength according to the absorption rate of the gel and/or according to a transmission rate of the gel, it is advantageously possible to efficiently achieve absorption of the laser radiation directly at the gel surface without damaging the sensing element located under the gel surface, for example due to too-deep penetration of the electromagnetic waves of the laser radiation.

In one example embodiment of the method of the present invention, a process gas formed during the application of laser radiation to the gel surface is removed, in particular suctioned off.

This results in the technical advantage, for example, that process gases produced correspondingly can be efficiently removed, in particular suctioned off. This is advantageous in particular if a process gas formed is harmful, for example toxic, depending on the gel used. As a result, for example, effects harmful to health can be efficiently avoided.

Statements made in connection with the method apply analogously to the sensor and vice versa. Technical functionalities of the method result analogously from corresponding technical functionalities of the sensor, and vice versa.

The sensor according to the second aspect of the present invention is, for example, a sensor which has been processed according to the method according to the first aspect.

The wording "at least one" means "one or more".

The gel within the meaning of the present description is in particular a protective medium for the sensing element, for example to protect the sensing element against external influences. The gel is configured, for example, to transmit a property and/or a composition of an ambient medium of the sensor to the sensing element.

The sensing element is configured, for example, to detect a property and/or a composition of an ambient medium of the sensor.

The sensor is, for example, a pressure sensor. This means, for example, that the sensing element can detect a pressure. The sensing element is thus configured, for example, to detect a pressure. The pressure here is the ambient pressure of the sensor.

The sensing element is designed, for example, as a micro-electromechanical (MEMS) system.

The sensing element is arranged on an ASIC, for example. ASIC stands for "Application Specific Integrated Circuit" and can be translated as user-specific integrated circuit.

The exemplary embodiments and embodiments described herein can be combined with one another in any desired manner, even when this is not explicitly described.

Instead of the term "gel" or in addition to the term "gel", the term "gel material" can also be used.

For example, laser radiation is applied to the entire gel surface, so that the entire gel surface is modified by the applied laser radiation.

For example, the housing is completely or partially filled with the gel.

The sensing element is cast using gel, for example.

The present invention is explained in more detail below using preferred exemplary embodiments.

DETAILED DESCRIPTION OF EXAMPLE EMBODIMENTS

In the following, the same reference signs can be used for identical features.

Figure 1:
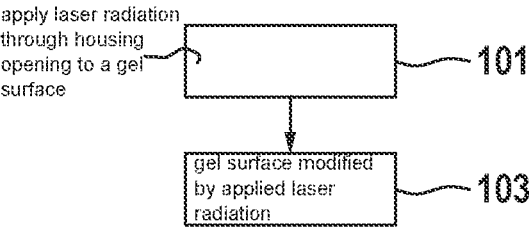
FIG. 1 shows a flow chart of a method for processing a sensor, according to an example embodiment of the present invention.

FIG. 1 shows a flow chart of a method for processing a sensor, in particular a pressure sensor, wherein the sensor has a sensing element arranged in a housing, wherein the housing has a housing opening, wherein a gel covering the sensing element is arranged inside the housing, wherein the method comprises the following steps: applying 101 laser radiation through the housing opening to a gel surface of the gel facing away from the sensing element, such that the gel surface is modified 103 by the applied laser radiation.

Figure 2:
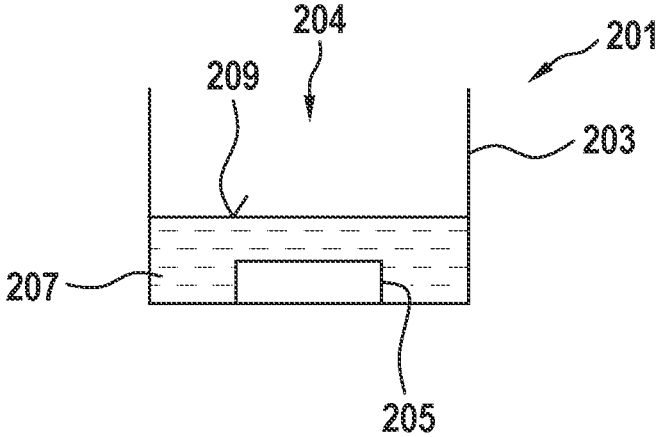
FIG. 2 shows a sensor according to an example embodiment of the present invention.

FIG. 2 shows a sensor 201, in particular a pressure sensor, comprising: a sensing element 205 arranged in a housing 203, wherein the housing 203 has a housing opening 204, wherein a gel 207 covering the sensing element 205 is arranged inside the housing 203, wherein the gel 207 has a gel surface 209 facing away from the sensing element 205 and modified by laser radiation.

Figure 3:
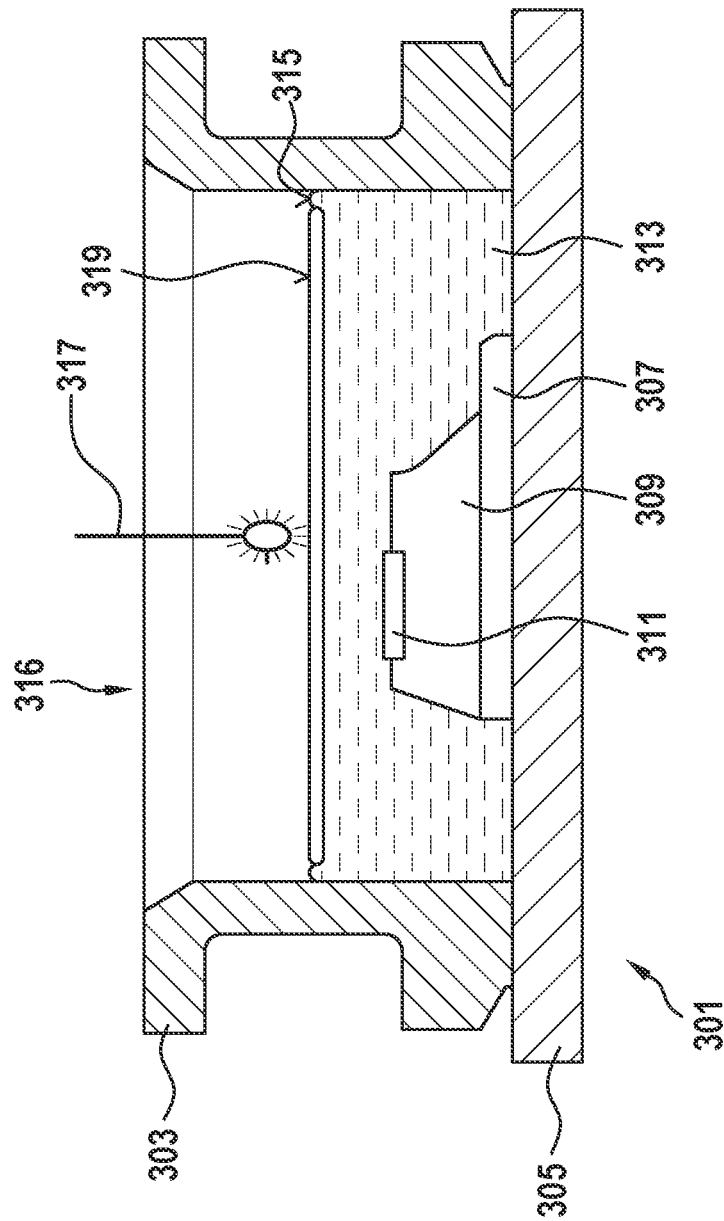
FIG. 3 shows a sensor during an application of laser radiation to the gel surface, according to an example embodiment of the present invention.

FIG. 3 shows a further sensor 301. The sensor 301 comprises a housing 303 arranged on a circuit board 305. An ASIC 307 is arranged inside the housing 303 and on the circuit board 305. A sensing element 309, which is configured to detect an ambient pressure of the sensor 301, is arranged on the ASIC 307. The sensing element 309 comprises a flexible membrane 311. The sensing element 309 is, for example, a MEMS sensing element.

A gel 313, which completely covers the sensing element 309, is arranged inside the housing 303. The housing 303 is thus partially cast or filled with gel 313 in the exemplary embodiment shown in FIG. 3.

The gel 313 has a gel surface 315 which faces away from the sensing element 309.

Laser radiation 317 is applied to this gel surface 315 through a housing opening 316 of the housing 303, such that this application modifies the gel surface 317 in the areas of application. The laser-modified gel surface is identified by the reference sign 319.

In FIG. 3, laser radiation 317 has not yet been applied to the entire gel surface 315, such that regions at an edge of the gel surface 315 are not yet modified. For example, laser radiation 317 is applied to the entire gel surface 315, such that the entire gel surface 315 is modified. For example, laser radiation 317 is applied only partially to the gel surface 315, such that only a portion of the gel surface 315 is modified by the applied laser radiation 317.

Figure 4:
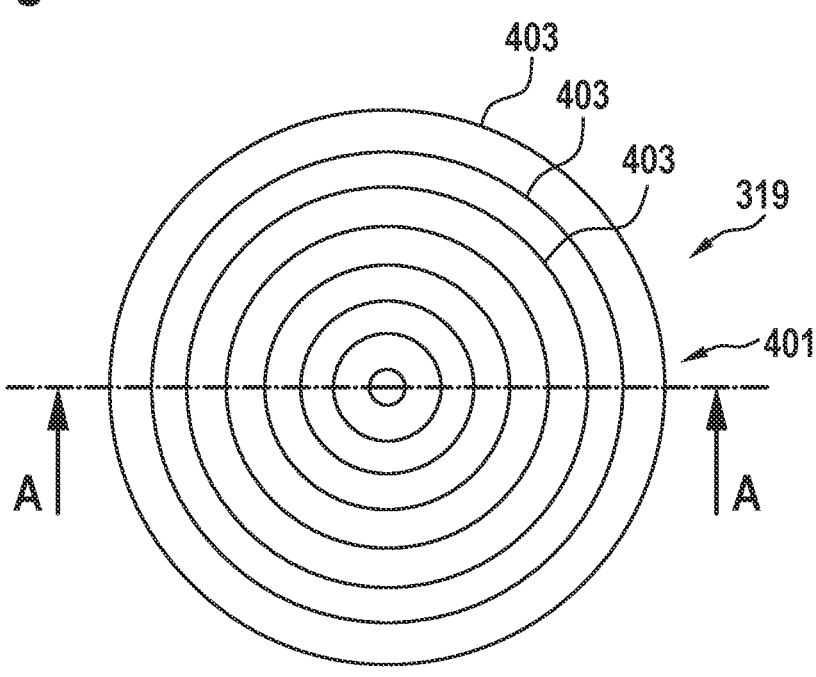
FIG. 4 is a plan view of a gel surface structured by applied laser radiation, according to an example embodiment of the present invention.

FIG. 4 is a plan view of a gel surface structured by applied laser radiation. The structure shown in FIG. 4 can, for example, be applied to the gel surface 315 by the laser radiation 317. For example, the relative movement between sensor 301 and laser beam 317 is such that the relative movement describes concentric circles. A ring structure 401 is thus formed, wherein the ring structure 401 comprises a plurality of concentric circles 403. Concentric is defined relative to the center of the housing 303 or is defined relative to the center of the gel surface 315.

Figure 5:
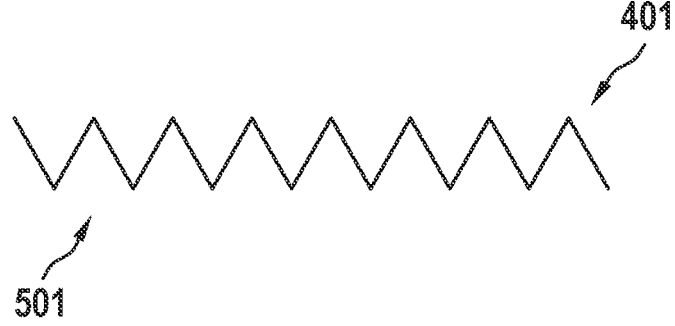
FIG. 5 is a sectional view of the modified gel surface according to FIG. 4, according to an example embodiment of the present invention.

FIG. 5 is a sectional view along line A-A as shown in FIG. 4 through the ring structure 401. The sectional view shows an accordion structure 501 of the ring structure 401.

Figure 6:
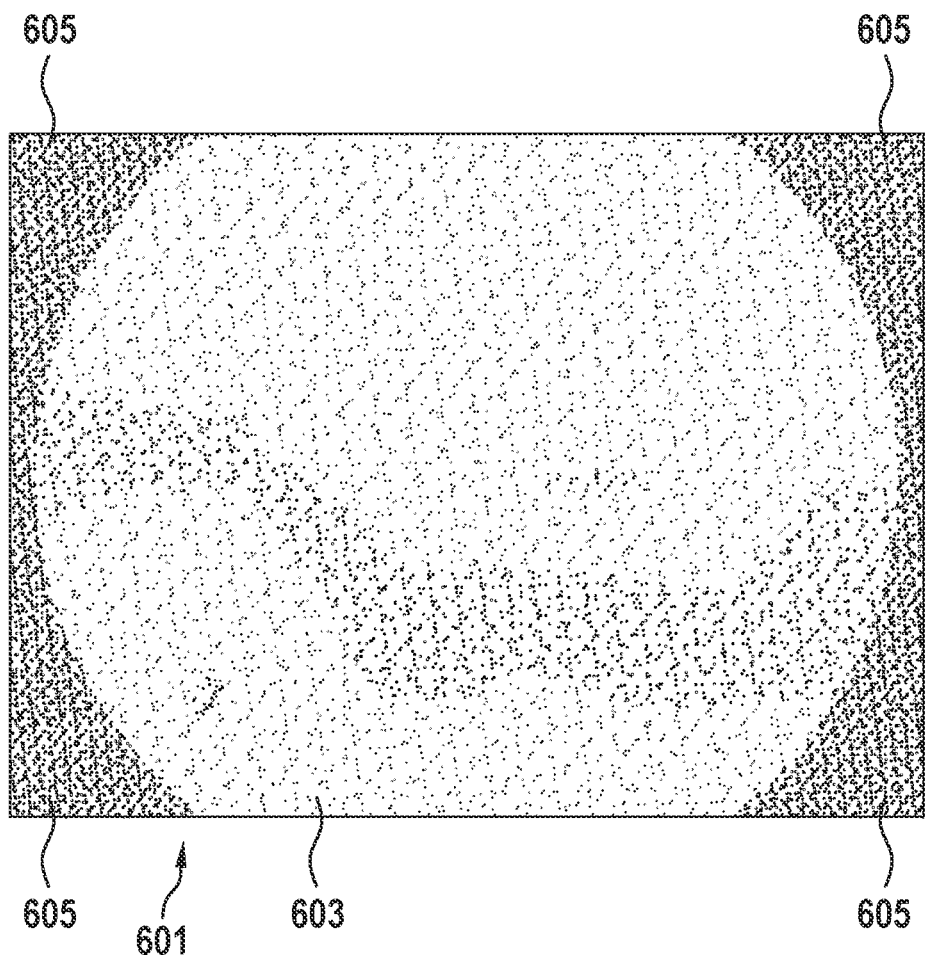
FIG. 6 shows a gel surface, according to an example embodiment of the present invention.

FIG. 6 shows a gel surface 601. Laser radiation was applied to a first region, which is identified by the reference sign 603. Regions to which laser radiation has not been applied are identified by the reference sign 605. A structuring of the gel surface 601 is clearly visible in the region 603 to which laser radiation has been applied, compared to the regions 605 to which laser radiation has not been applied.

Figure 7:
FIG. 7 shows an enlarged cutout portion of an untreated, i.e., before laser treatment, region of the gel surface according to FIG. 6.

FIG. 7 shows an enlarged cutout portion of a region 605, to which laser radiation has not been applied, of the gel surface 601 according to FIG. 6.

Figure 8:
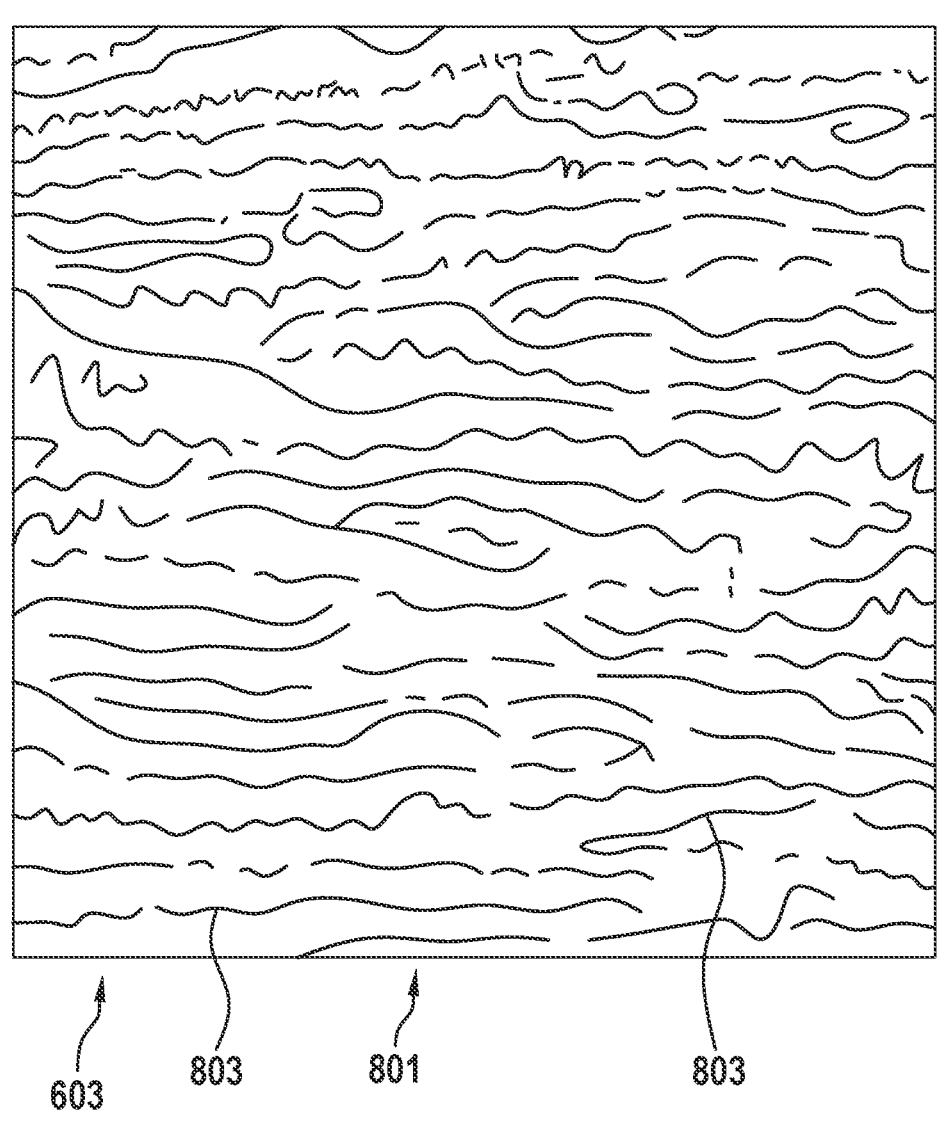
FIG. 8 shows an enlarged cutout portion of a treated, i.e., after laser treatment, region of the gel surface according to FIG. 6.

FIG. 8 shows an enlarged cutout portion of the region 603, to which laser radiation has thus been applied. Visible here is a line structure 801 comprising a plurality of lines 803, which extend at least partially in parallel.

Figure 9:
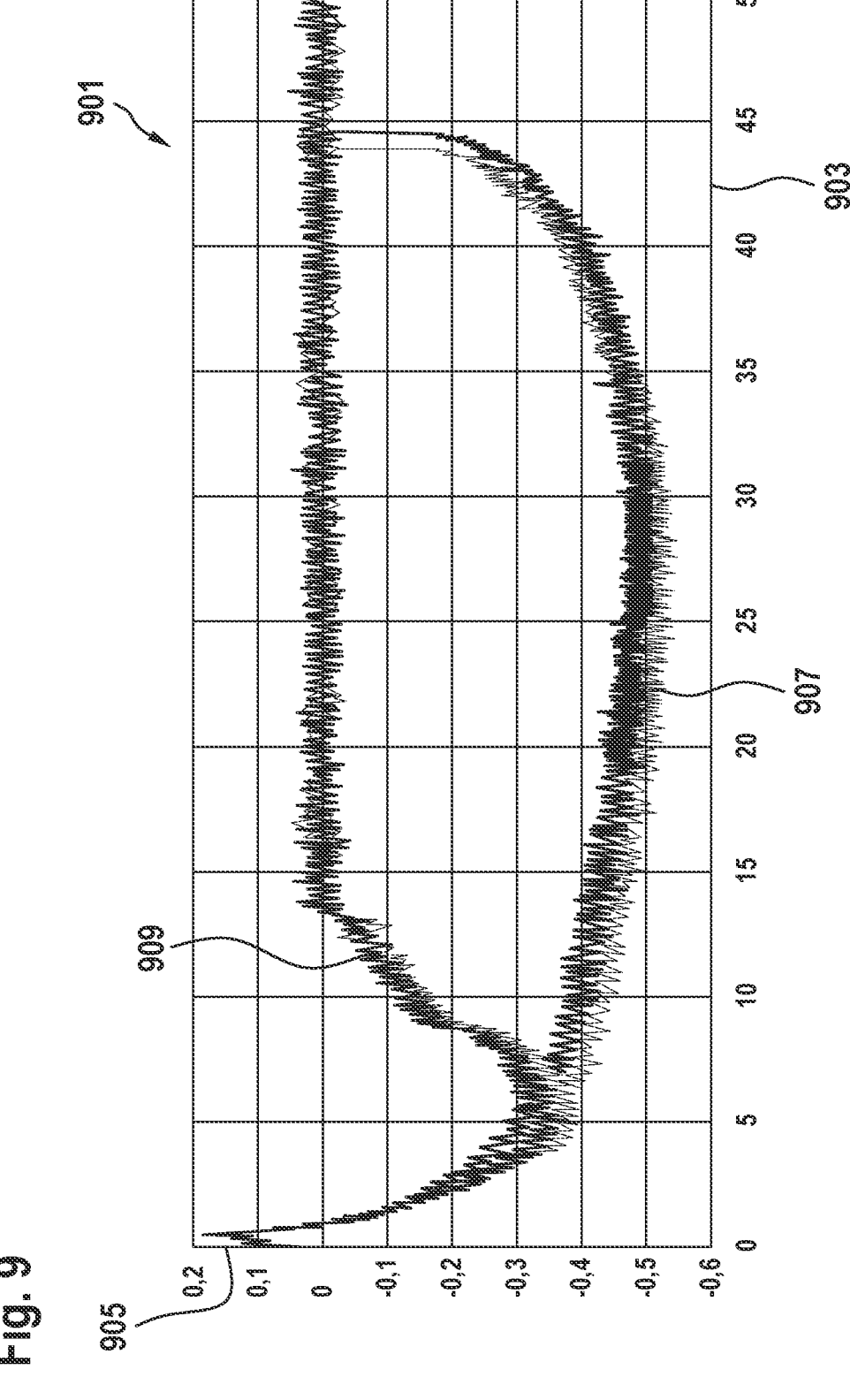
FIG. 9 shows a graph showing the result of a tack test before and after laser radiation has been applied to a gel surface.

FIG. 9 shows a graph 901 which shows the result of a tack test before and after a gel surface has been applied with laser radiation. An abscissa of the graph 901 is provided with the reference sign 903. An ordinate of the graph 901 is provided with the reference sign 905.

The abscissa indicates the time in seconds. The ordinate indicates a standard force in Newtons.

The tack test was carried out using a texture analyzer. Here, a stamp or an indenter dips once for a short distance into the unprocessed gel surface, i.e., without laser radiation being applied thereto, and once into the processed gel surface, i.e., once after laser radiation has been applied thereto, and then moves back to its starting position. In this process, the gel sticks to the indenter or stamp and tensile forces are measured. The measured tensile forces (negative sign) form the measure of the tack of the gel.

The reference sign 907 indicates the measured tensile forces for an unprocessed gel surface. The reference sign 909 indicates the measured tensile forces for a processed gel surface. As can be seen, the tack of the gel is reduced after the gel surface has been applied with laser radiation.

In the embodiment according to FIG. 9, a travel speed of the stamp or of the indenter was 0.5 mm/s.

In summary, the concept described here is based in particular on the fact that after gel casting a sensing element, the highly sticky gel surface is modified using a laser process, in particular a UV laser process, i.e., an application of laser radiation, by means of a material removal process and/or a structuring process, such that the surface tack is reduced and the resulting gel surface obtains improved elasticity due to the structure. A gel layer thickness to be removed is, for example, at least 25 µm, such that a desired effect on the reduced surface stickiness can advantageously be achieved.

The laser wavelength range to be selected is, for example, matched to the gel material, in particular optimally matched.

This is done in particular with the aim of achieving the greatest possible absorption capacity of the laser light. This is done in particular with the aim of bringing about absorption already in the uppermost layer of the gel. This is done in particular with the aim of bringing about no, or only a slight, thermal influence on the remaining gel material, for example using the lowest possible laser power and/or ultrashort laser pulses. This is done in particular with the aim that no transmission of the laser light to the sensing element and/or, for example, to the ASIC and/or to the circuit board and/or to a microelectronics unit is brought about.

By modifying the gel surface, the corrosion and media protection of the gel casting, which is important for the sensing element, continues to be advantageously provided.

The (suitable) laser wavelengths, for example 355 nm, depend on the gel material.

Laser types for gel surface treatment of the gel are, for example, in the following wavelength ranges:

$100 < \lambda < 225$ nm (laser: deep UV/excimer: $Ar_2$, $Kr_2$, $F_2$, $Xe_2$, ArF)

$7.8 < \lambda < 8.3$ μm (laser: CO laser)

The wavelength ranges mentioned are determined, for example, by means of transmission spectrum analyses. Laser processing is particularly advantageous in these ranges, as here absorption rates of >80% can be achieved. The laser light is thus absorbed directly at the gel surface without damaging the sensing element underneath (e.g., through too-deep penetration of the electromagnetic waves/excessively high transmission rates/incorrect wavelengths).

For example, 25 μm or more of material can be removed from the gel surface by laser ablation during the application.

For example, a structured gel surface is formed which corresponds in its surface area of e.g., a circular surface with a maximum diameter of 2.5 mm, i.e., with a maximum surface area of approximately 4.9 $mm^2$.

For example, a linear structure of the circular surface is formed as a result of the targeted material removal. The linear structure has, for example, a plurality of lines which, for example, each have a line spacing of, for example, between 5 μm and 25 μm in each case, including the lower and upper limit.

For example, a focus of the laser radiation lies on the gel surface.

For example, the focus is readjusted each time the laser radiation passes over the gel surface.

For example, a focus of the laser radiation is slightly below the gel surface. Below the gel surface refers, for example, to the center of the target removal height, for example 25 μm/2=12.5 μm. For example, in such a case the focus is not readjusted, i.e., is kept constant.

The focus diameter of the laser radiation is, for example, between 15 μm and 20 μm, including the lower and upper limits.

For example, the laser radiation is passed over the gel surface once or multiple times. For example, the laser passes over the gel surface between 5 and 10 times, including the upper and lower limit.

A produced circular line structure (see for example FIG. 4) advantageously allows, in the case of the gel thermally expanding in the temperature range of from −25° C. to 80° C., a higher elasticity of the structured gel surface than in the case of material removal without a circular line structure. As a result, differences that occur in the linear expansion of the gel surface compared to the rest of the gel are better compensated for, and pressure errors/temperature hystereses measured by the sensing element, for example, are reduced due to the strong thermally induced gel expansion.

The concept described here has, in particular, the following advantages:

Reduction of the surface tack of gels as a result of the described laser surface treatment without impairing the properties of the gel underneath.

As a result, reduction of the degree of soiling (dirt can no longer adhere).

Reduction of the crust formation described in the related art as a result of adhesion of dirt (e.g., hair, dust, etc.).

Improvement of the elasticity of the produced layer by, for example, a linearly/circularly structured surface (accordion effect).

As a result, differences that occur in the linear expansion of the removal surface compared to the rest of the gel are well compensated for, and measured pressure errors/temperature hystereses are reduced due to the strong thermal gel expansion.

Increased sensitivity of the sensor over its service life.

Greater flexibility in the gel selection, since the surface tack can be neutralized by the laser treatment and this is no longer a decision criterion for the gel selection.

Also allowing the use of low-cost gels, even having high tack, since this can be reduced or neutralized by laser radiation.

Continued use of a previous system technology for the production of sensors with gel is possible, because normal gel casting is a proven standard solution.

Due to the low process time, the laser process allows large-series production.

A sensor, in particular a pressure sensor, within the meaning of the present description can be used for example in smart applications such as: smart phones, smart watches, tablets, altimeters or similar "smart" consumer goods, wherein pressure sensors advantageously allow air pressure measurements such that an altitude can be determined using them.

What is claimed is:

1. A method for processing a sensor, wherein the sensor has a sensing element arranged in a housing, the housing having an opening, wherein a gel covering the sensing element is arranged inside the housing, the method comprising:

applying laser radiation through the housing opening to a gel surface of the gel facing away from the sensing element, such that the gel surface is modified by the applied laser radiation, wherein the modification includes structuring the gel surface, the structuring including forming a ring structure having a plurality of concentric rings, and/or forming a line structure having a plurality of parallel lines.

2. The method according to claim 1, wherein the sensor is a pressure sensor.

3. The method according to claim 1, wherein the modification includes removing gel material from the gel surface and/or structuring the gel surface and/or planar processing the gel surface.

4. The method according to claim 1, wherein at least one irradiation parameter of the laser radiation is determined based on at least one gel property, wherein the application of laser radiation to the gel surface is carried out based on the at least one irradiation parameter.

5. The method according to claim 4, wherein the at least one irradiation parameter is in each case an element selected from the following group of irradiation parameters: laser wavelength, laser power, laser beam diameter, pulse duration in the case of pulsed laser radiation, pulse frequency in the case of pulsed laser radiation.

6. The method according to claim 4, wherein the at least one gel property includes an optical gel property.

7. The method according to claim 1, wherein a process gas formed during the application of laser radiation to the gel surface is suctioned off.

8. A method for processing a sensor, wherein the sensor has a sensing element arranged in a housing, the housing having an opening, wherein a gel covering the sensing element is arranged inside the housing, the method comprising:

applying laser radiation through the housing opening to a gel surface of the gel facing away from the sensing element, such that the gel surface is modified by the applied laser radiation, wherein the sensor and the laser radiation are moved relative to each other during the application of laser radiation to the gel surface based on a specified target relative movement.

9. A sensor, comprising:

a sensing element arranged in a housing, wherein the housing has a housing opening, wherein a gel covering the sensing element is arranged inside the housing, wherein the gel has a gel surface facing away from the sensing element and modified by laser radiation, wherein the modification includes a ring structure having a plurality of concentric rings, and/or line structure having a plurality of parallel lines.

10. The sensor according to claim 9, wherein the sensor is a pressure sensor.

* * * * *